US010871281B2

(12) United States Patent
Marinus et al.

(10) Patent No.: US 10,871,281 B2
(45) Date of Patent: Dec. 22, 2020

(54) LIGHTING DEVICE WITH LIGHT GUIDE

(71) Applicant: SIGNIFY HOLDING B.V., Eindhoven (NL)

(72) Inventors: Antonius Adrianus Maria Marinus, Eindhoven (NL); Erik Paul Boonekamp, Eindhoven (NL); Hendrik Jan Eggink, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/745,269

(22) PCT Filed: Jul. 20, 2016

(86) PCT No.: PCT/EP2016/067226
§ 371 (c)(1),
(2) Date: Jan. 16, 2018

(87) PCT Pub. No.: WO2017/013141
PCT Pub. Date: Jan. 26, 2017

(65) Prior Publication Data
US 2018/0216810 A1 Aug. 2, 2018

(30) Foreign Application Priority Data
Jul. 20, 2015 (EP) .................................... 15177430

(51) Int. Cl.
*F21K 9/61* (2016.01)
*F21V 29/70* (2015.01)
(Continued)

(52) U.S. Cl.
CPC ............ *F21V 29/503* (2015.01); *F21K 9/232* (2016.08); *F21K 9/238* (2016.08); *F21K 9/61* (2016.08);
(Continued)

(58) Field of Classification Search
CPC . F21K 9/232; F21K 9/238; F21K 9/61; F21V 23/003; F21V 29/503; F21V 29/70; G02B 6/002; G02B 6/0036; G02B 6/0085
See application file for complete search history.

(56) References Cited

U.S. PATENT DOCUMENTS 8,314,537 B2 * 11/2012 Gielen ................... F21V 29/67
313/46
8,414,160 B2 * 4/2013 Sun .......................... F21K 9/90
313/46
(Continued)

FOREIGN PATENT DOCUMENTS

CN 102313156 A 1/2012
CN 202266903 U 6/2012
(Continued)

*Primary Examiner* — Arman B Fallahkhair

(57) ABSTRACT

A lighting device (100, 500) is provided which comprises a light guide (110, 510), a metal strip (120, 520), a solid state light source (130, 530) and a base (160, 170, 540, 550) for mounting the lighting device. The base includes an electrical interface. The light guide extends along a plane (140). The metal strip extends at least partly around the light guide along a surface (111) of the light guide. The metal strip is arranged in thermal contact with the surface of the light guide. The solid state light source is arranged in thermal contact with the metal strip and is arranged to emit light into the light guide. The light guide serves to increase a light emitting area of the lighting device and to dissipate heat. The metal strip allows heat generated by the solid state light source to be transferred to the light guide.

19 Claims, 5 Drawing Sheets

(51) Int. Cl.
*F21V 29/503* (2015.01)
*F21V 8/00* (2006.01)
*F21K 9/232* (2016.01)
*F21K 9/238* (2016.01)
*F21V 23/00* (2015.01)
*F21Y 115/10* (2016.01)
*F21Y 101/00* (2016.01)
*F21Y 105/10* (2016.01)

(52) U.S. Cl.
CPC ............ *F21V 23/003* (2013.01); *F21V 29/70* (2015.01); *G02B 6/002* (2013.01); *G02B 6/0036* (2013.01); *G02B 6/0085* (2013.01); *F21Y 2101/00* (2013.01); *F21Y 2105/10* (2016.08); *F21Y 2115/10* (2016.08)

(56) References Cited

U.S. PATENT DOCUMENTS

| | | | | |
|---|---|---|---|---|
| 8,669,704 | B2* | 3/2014 | Marinus | H05B 33/0809 |
| | | | | 315/35 |
| 8,729,781 | B2* | 5/2014 | Ter Weeme | F21V 3/00 |
| | | | | 313/46 |
| 8,926,123 | B2* | 1/2015 | Thrailkill | F21V 29/004 |
| | | | | 362/235 |
| 8,956,011 | B2* | 2/2015 | Ariyoshi | F21V 29/004 |
| | | | | 362/249.02 |
| 9,109,789 | B2* | 8/2015 | Uhler | F21V 29/74 |
| 9,500,355 | B2* | 11/2016 | Kuenzler | F21V 7/048 |
| 9,989,194 | B2* | 6/2018 | Marinus | F21V 3/04 |
| 9,989,195 | B2* | 6/2018 | Marinus | F21V 3/06 |
| 10,006,608 | B2* | 6/2018 | Bukkems | H05K 1/0209 |
| 2010/0027293 | A1* | 2/2010 | Li | G02B 6/002 |
| | | | | 362/619 |
| 2010/0302770 | A1 | 12/2010 | Lee et al. | |
| 2012/0020108 | A1* | 1/2012 | Chang | G02B 6/0011 |
| | | | | 362/555 |
| 2012/0081880 | A1 | 4/2012 | Narendran et al. | |
| 2012/0169235 | A1 | 7/2012 | Dassanayake et al. | |
| 2012/0243230 | A1* | 9/2012 | Carroll | F21V 23/003 |
| | | | | 362/249.02 |
| 2015/0085492 | A1 | 3/2015 | Kato et al. | |

FOREIGN PATENT DOCUMENTS

| | | |
|---|---|---|
| CN | 202546362 U | 11/2012 |
| CN | 203115772 U | 8/2013 |
| DE | 102006001976 A1 | 8/2007 |
| EP | 2295853 B1 | 3/2011 |
| JP | 2009026708 A | 2/2009 |
| JP | 2011288168 A | 11/2011 |
| WO | WO2011107925 A1 | 9/2011 |
| WO | WO2012085853 A1 | 6/2012 |
| WO | WO-2014087357 A1 * 6/2014 ........... H05K 1/0209 |
| WO | WO2014087363 A1 | 6/2014 |
| WO | WO2014087366 A1 | 6/2014 |
| WO | WO2014180689 A1 | 11/2014 |
| WO | WO2014184008 A1 | 11/2014 |

\* cited by examiner

LIGHTING DEVICE WITH LIGHT GUIDE

CROSS-REFERENCE TO PRIOR APPLICATIONS

This application is the U.S. National Phase application under 35 U.S.C. § 371 of International Application No. PCT/EP2016/067226, filed on Jul. 20, 2016, which claims the benefit of European Patent Application No. 15177430.4, filed on Jul. 20, 2015. These applications are hereby incorporated by reference herein.

FIELD OF THE INVENTION

The present invention generally relates to the field of lighting devices, and in particular to the field of lighting devices comprising solid state light sources.

BACKGROUND OF THE INVENTION

Replacement of traditional light sources, such as incandescent light bulbs, by solid state light sources, such as light emitting diodes (LEDs), is often associated with a number of issues. For example, the light output provided by a LED typically has a different spectral composition than the light output of a traditional light source, for example based on an incandescent filament. Further, the spatial intensity distribution of the light output of a LED is typically different than the spatial intensity distribution of the light output provided by a traditional light source. Moreover, heat generated during operation of the LEDs may damage or deteriorate performance of the LEDs. Therefore, design of LED-based lighting devices typically involves considerations relating to heat management.

WO2014/087363A1 discloses a flat lighting device in which a solid state light source is arranged on a carrier having a thermally conductive layer. An electrically insulating cover member is arranged in thermal contact with the carrier for transferring heat from the carrier out of the lighting device. The cover member comprises an optical structure arranged on the carrier in front of the light source and adapted to direct the light emitted by the light source. The short thermal path between the light source and the outside of the cover allows for efficient heat management. However, the design of this flat lighting device causes the light emitting area to be relatively small compared to the total size of the lighting device.

SUMMARY OF THE INVENTION

It would be advantageous to achieve a lighting device addressing one or more of the above mentioned issues. In particular, it would be desirable to enable a more efficient heat management for a lighting device with a relatively larger light emitting area.

To better address one or more of these issues, a lighting device having the features defined in the independent claim is provided. Preferable embodiments are defined in the dependent claims.

Hence, according to embodiments, a lighting device is provided. The lighting device comprises a light guide, a metal strip, a solid state light source, a longitudinal axis A and a base for mounting the lighting device. The base includes an electrical interface. The light guide extends along a plane. The longitudinal axis passing through the base and a center plane of the light guide. The metal strip extends at least partly around the light guide along a surface of the light guide. The metal strip is arranged in thermal contact with the surface. The solid state light source is arranged in thermal contact with the metal strip and is arranged to emit light into the light guide.

The inventors have realized that the light guide may be employed both for increasing a light emitting area of the lighting device and for dissipating heat from the lighting device.

In the present embodiments, light emitted by the solid state light source propagates within the light guide (e.g. including one or more total internal reflections within the light guide) before exiting the light guide. The light guide provides a larger light emitting area than the light emitting area of a (single) solid state light source and increases the light emitting area of the lighting device. Whether a given light ray is able to exit the light guide at a particular location (e.g., instead of being reflected within the light guide) may for example depend on a surface structure of the light guide at that location and/or an angle of the light ray relative to a surface of the light guide at that location.

The thermal contact between the solid state light source and the metal strip allows heat to be transferred from the solid state light source to the metal strip. The thermal contact between the metal strip and the surface of the light guide allows heat to be transferred from the metal strip to the light guide from which the heat may be dissipated to the surroundings. As the metal strip extends at least partly around the light guide, heat from the solid state light source may be more efficiently transferred via the metal strip to the light guide. The arrangement of the metal strip at least partly around the light guide therefore improves heat management of the lighting device.

Use of the light guide to dissipate heat from the light guide reduces the need for additional heat sinks which could otherwise reduce the light emitting area of the lighting device and/or obstruct light emitted by the solid state light source.

The base may for example be adapted for mounting the lighting device in (or attaching the lighting device to) a socket.

The base may for example be adapted for mounting the lighting device at (or attaching the lighting device to) a dedicated position in a lamp, luminaire or lighting arrangement.

The electrical interface may for example be adapted for connecting the lighting device to an electric power supply when the lighting device is mounted.

The base may for example include an AC/DC converter.

The electrical interface may for example be in electrical contact with the solid state light source.

The light guide may for example be at least partially light transmissive, such as transparent or translucent.

The light guide may for example comprise transparent or translucent parts/portions.

The light guide may for example be thermally conductive.

The light guide may for example comprise thermally conductive parts/portions.

According to some embodiments, the light guide may have at least two main surfaces and an edge joining the two main surfaces. The metal strip may extend along the edge.

The main surfaces may provide a major part/portion of the light output from the lighting device. Arranging the metal strip to extend along the edge of the light guide (rather than along the main surfaces) may reduce an amount of light obscured or shadowed by the metal strip. Reducing the amount of light obscured or shadowed by the metal strip may provide a more omnidirectional light output.

The light guide may for example allow at least some light emitted by the solid state light source to propagate between the main surfaces and/or the edge (e.g., including one or more reflections within the light guide) before being emitted from the light guide (e.g., from the main surfaces and/or the edge).

The light guide may for example be a plate having two main surfaces (e.g., extending in substantially parallel planes) and an edge.

The edge may for example be normal to the plane along which (main surfaces of) the light guide extends.

According to some embodiments, the base may be a cap for mounting the lighting device in a socket. The cap may for example be a screw type cap (e.g. E14, E27), bayonet type cap (e.g. B22d, Ba15d), or another type of cap, such as G4 or GU10.

The lighting device may for example be a retrofit lighting device in the sense that it may be adapted for replacing more traditional lighting devices such as incandescent light bulbs or halogen lamps, e.g. by having a cap adapted for mounting the lighting device in a socket employed for such more traditional lighting devices (e.g. E14, E27, B22d, Ba15d, G4, GU10).

According to some embodiments, the light guide may comprise glass or polymer material.

Glass may for example transfer heat more efficiently than polymer materials.

Polymer materials such as polymethyl methacrylate (PMMA) or polycarbonate (PC) may for example be associated with lower optical losses than glass, i.e. may have lower optical absorption than glass.

The light guide may for example be made of glass and/or polymer material.

The light guide may for example comprise other materials in addition to the glass or polymer material.

According to some embodiments, the light guide may extend at least four times more in a direction along the plane than along a normal to the plane. In other words, the light guide may have a flat shape in the sense that it may extend a distance along the plane which is at least four times as long as a distance covered by the light guide along a direction normal (or perpendicular) to the plane. In at least some embodiments where the metal strip extends along an edge of the light guide (rather than along a main surface of the light guide), this flat shape of the light guide may reduce an amount of light obscured or shadowed by the metal strip.

A length or diameter of the light guide may for example be at least four times a thickness of the light guide.

According to some embodiments, the metal strip may extend at least a third of a full revolution around the light guide, or the lighting device may comprise at least two metal strips together extending at least a third of a full revolution around the light guide. By one or more metal strips extending at least a third of a revolution around the light guide is meant that the metal strip(s) extends such that it covers at least an angle of 240 degrees out of a total of 360 degrees around the light guide. The metal strip may for example extend (or the metal strips may for example together extend) at least halfway around the light guide, i.e. the metal strip(s) may extend such that it covers at least half a revolution around the light guide, or in other words, at least an angle of 180 degrees out of a total of 360 degrees around the light guide. Increasing the length of the metal strip along the light guide may facilitate transfer of heat from the metal strip to the light guide.

The at least two metal strips together extending at least halfway around the light guide may for example both be in thermal contact with a solid state light source arranged to emit light into the light guide.

According to some embodiments, the metal strip may be arranged in direct physical contact with the surface of the light guide, or a distance between the metal strip and the surface of the light guide may be less than 200 micrometer or 100 micrometer. Heat transfer between the metal strip and the light guide may be facilitated by decreasing the distance between the metal strip and the surface of the light guide.

According to some embodiments, the solid state light source may be arranged between the light guide and the metal strip.

The solid state light source may for example be arranged adjacent to the light guide and/or to the metal strip.

The solid state light source may for example be arranged in thermal contact with both the light guide and the metal strip.

The solid state light source may for example be arranged to face the surface or edge of the light guide along which the metal strip is arranged.

According to some embodiments, the lighting device may comprise a plurality of solid state light sources distributed around the light guide (or distributed at a periphery of the light guide) between the light guide and the metal strip. The solid state light sources may be arranged to emit light into the light guide. Solid state light sources distributed around the light guide (or distributed at a periphery of the light guide) allows for providing a more uniform distribution of heat along the light guide, and/or a more omnidirectional light output of the lighting device.

The solid state light sources may for example be arranged in thermal contact with the metal strip.

The solid state light sources may for example be arranged to face the surface or edge of the light guide along which the metal strip is arranged.

According to some embodiments, the light guide may have a cavity in which the solid state light source is arranged.

Arrangement of the solid state light source in the cavity may facilitate assembly of the lighting device, for example in embodiments where the cavity is arranged at a base of the lighting device.

A wall or surface of the cavity may for example act as an incoupling structure for coupling light emitted by the solid state light source into the light guide.

According to some embodiments, at least a side of the metal strip facing the light guide may have at least 80, 90 or 95 percent reflectivity. Having such a reflective metal strip allows for light from the light guide to be reflected back into the light guide, which may increase the average distance traveled by light within the light guide. By increasing the average distance traveled by light within the light guide, a more omnidirectional light output of the lighting device may be provided.

The metal strip may for example have a reflective coating or layer on a side facing the light guide.

According to some embodiments, the metal strip may be perforated. Perforations in the metal strip allows for light to be emitted through the metal strip, which allows for a more omnidirectional light output of the lighting device.

Distances covered by the perforations/openings along the plane may together amount to at least 25 or 50 percent of a length of the metal strip.

An inside (or inner walls of) the perforations or openings of the metal strip may for example have at least 80, 90 or 95 percent reflectivity for further increasing the omnidirectionality of the light output of the lighting device. A desired reflectivity may for example be obtained at the inside of the perforations via deposition of a reflective coating within the perforations.

According to some embodiments, the light guide may have two main surfaces and an edge joining the two main surfaces. The metal strip may extend along the edge and may have a width which is smaller than a width of the edge. The use of a metal strip which is narrower than the edge (of the light guide) along which the metal strip extends allows for light to be emitted from parts of the edge not covered by the metal strip, which allows for a more omnidirectional light output of the lighting device. According to some embodiments, the lighting device may further comprise an incoupling structure (or incoupling structures) for coupling light from the solid state light source into the light guide.

The incoupling structure(s) may for example be arranged to increase the amount of light from the solid state light source which is able to enter the light guide.

The incoupling structure(s) may for example be arranged between the solid state light source and the light guide (or between the solid state light source and a part/portion of the light guide).

The incoupling structure(s) may for example include a shape or structure of a surface of the light guide facing the solid state light source.

According to some embodiments, the lighting device may further comprise an outcoupling structure (or outcoupling structures) for coupling light propagating within the light guide out of the light guide.

The outcoupling structure(s) may for example be arranged at one or more main surfaces of the light guide.

The outcoupling structure(s) may for example include a shape or structure of a surface of the light guide, such as defects, irregularities, impurities or perforations, e.g. causing local escape of light from the light guide.

The outcoupling structure(s) may for example be employed to scatter light output from the light guide (e.g., for provide a more omnidirectional light output).

The outcoupling structures may for example be light scatter dots (e.g. white paint applied by screen printing) or refractive (micro) structures or facets applied on one or more surfaces of the light guide.

According to some embodiments, the lighting device may further comprise driver electronics for controlling the solid state light source. The light guide may have a cavity in which the driver electronics are arranged. Arranging the driver electronics in a cavity of the light guide reduces the number of components/parts of the lighting device, which may facilitate assembly and/or reduce production costs.

Alternatively, the lighting device may further comprise a housing in which the driver electronics are arranged.

The housing may for example comprise polymer material (e.g. for providing electrical insulation).

The housing may for example comprise metal (e.g. for transferring heat away from the driver electronics).

According to some embodiments, the metal strip may be a flat metal band extending at least partly around the light guide.

In embodiments where the metal strip is arranged along an edge of the light guide, the flat shape of the metal strip (or band) may reduce the amount of light obscured or shadowed by the metal strip.

The metal strip may for example have a flat cross-section.

The metal strip may for example be normal to the plane along which the light guide extends.

It is noted that embodiments of the invention relates to all possible combinations of features recited in the claims.

BRIEF DESCRIPTION OF THE DRAWINGS

This and other aspects will now be described in more detail with reference to the appended drawings showing embodiments.

All the figures are schematic, not necessarily to scale, and generally only show parts which are necessary in order to elucidate the embodiments, wherein other parts may be omitted or merely suggested.

DETAILED DESCRIPTION

The present invention will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and for fully conveying the scope of the present disclosure to the skilled person.

Figure 1:
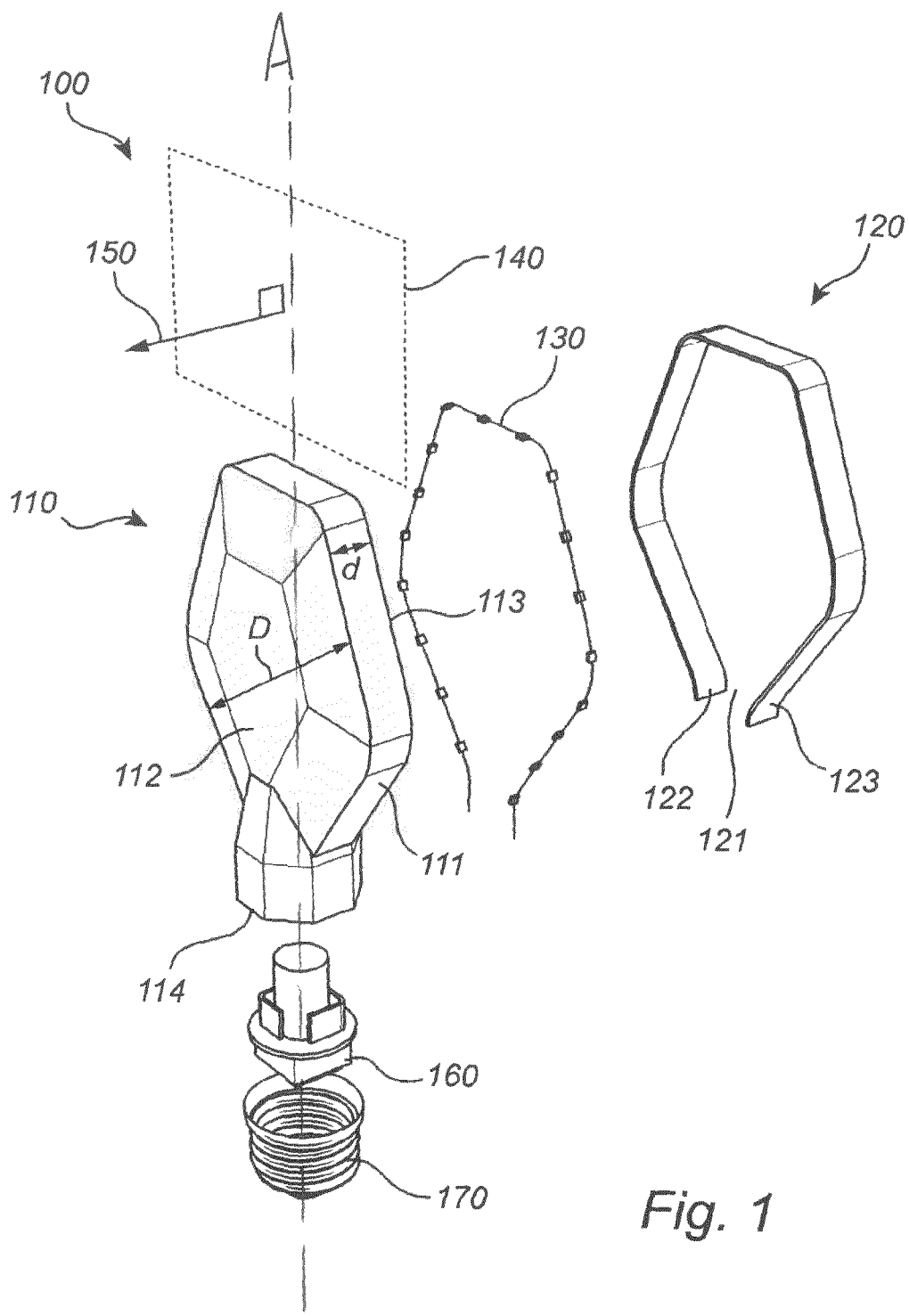
FIG. 1 shows an exploded view of a lighting device according to an embodiment.

FIG. 1 shows an exploded view of a lighting device 100 according to an embodiment. The lighting device 100 comprises a light guide 110, a metal strip 120 and a plurality of solid state light sources 130. Further, it comprises a base 170 and a longitudinal axis A passing through said base 170. The light guide 110 extends along a plane 140, said plane being positioned in parallel with the longitudinal axis A. The metal strip 120 extends at least partly around the light guide 110 (in other words, the light guide 120 is at least partly surrounded by the metal strip 120) along a surface 111 of the light guide 110, and the metal strip 120 is arranged in thermal contact with the surface 111 of the light guide 110. The solid state light sources 130 are arranged in thermal contact with the metal strip 120 and are arranged to emit light into the light guide 110.

The light guide 110 is exemplified herein by a solid plate 110 having two main surfaces 112 and 113 and an edge 111 joining the two main surface 112 and 113. In the present example, the edge 113 is the surface 113 along which the metal strip 120 is arranged, and the edge 111 is normal to the plane 140 along which the light guide 120 extends. In other words, the edge 111 is parallel to a normal vector 150 of the plane 140. The light guide 110 is flat in the sense that it extends at least four times more in a direction along the plane 140 than along a normal 150 to the plane. In other words, the light guide 110 extends a distance D along the plane 140, but only a distance d along a direction 150 which is normal (or perpendicular to) the plane 140, where D≥4d. The distance d covered by the light guide 110 along a direction 150 normal to the plane 140 may be regarded as a thickness of the light guide 110. The distance D covered by the light guide 110 along the plane 140 may be regarded as a length or height of the light guide 110.

The light guide 110 may for example have a thickness of 8-12 mm.

The light guide 110 is transparent or translucent so that light may propagate therein. The light guide 110 comprises thermally conductive material so that the light guide 110 may dissipate heat. The light guide 110 may for example be made of (solid) glass or polymer material such as polymethyl methacrylate (PMMA) or polycarbonate (PC).

The metal strip 120 is exemplified herein by a flat metal band 120 (or flat sheet metal ribbon) folded around the edge 111 of the light guide 110 such that the metal strip 120 is normal to the plane 140 along which the light guide 110 extends.

The metal strip 120 may for example be made of copper or aluminum.

The metal strip 120 may for example be manufactured by extrusion.

The metal strip 120 may for example be a die cast product.

The metal strip 120 may for example manufactured based on sheet metal.

The metal strip 120 may for example be as wide as the thickness d of the light guide 110.

The metal strip 120 may for example have a thickness of 2-5 mm.

The solid state light sources 130 are exemplified herein by light emitting diodes 130 (LEDs), distributed along the edge 111 of the light guide 110. In the present embodiment, the LEDs 130 are arranged between the light guide 110 and the metal strip 120, and are arranged to face the edge 111 of the light guide 110. The LEDs 130 may for example be arranged as a string of LEDs 130 connected to each other by electrically conductive material.

The LEDs 130 may emit light of one or more colors. LEDs 130 of different colors may for example be employed to provide a white light mix.

In the present embodiment, the light guide 110 comprises a cavity 114 for receiving driver electronics 160 for controlling the LEDs 130. When assembled, the lighting device 100 comprises the driver electronics 160 for controlling the LEDs 130, and a base 170 for mounting the lighting device 100. The base 170 has an electrical interface for connecting the lighting device 100 to an electric power supply when the lighting device 100 is mounted at a dedicated position in a lamp, luminaire or lighting arrangement.

Integration of the driver electronics 160 in the cavity 114 of the light guide 110 reduces the number of components of the lighting device 100, which may facilitate assembly of the lighting device 100.

In other embodiments, such as the embodiment described below with reference to FIG. 3, a more modular approach may be employed, wherein the driver electronics 160 are arranged in a separate housing.

In the present embodiment, the base 170 includes a cap 170 for mounting the lighting device 100 in a socket and the driver electronics 160 includes an AC/DC converter. The lighting device 100 of the present embodiment is a retrofit lighting device with a cap 170 for mounting the lighting device 100 in a standard socket, for example a E14, E27, B22d, Ba15d, G4 or GU10 socket. In other embodiments, the lighting device 100 may be adapted to receive direct current. The lighting device 100 may for example not comprise an AC/DC converter. An AC/DC converter may for example be arranged in a lamp or lighting arrangement in which multiple lighting devices 100 are mounted, such as in a chandelier.

In some embodiments, the base 170 may for example include a USB interface/contact for mounting the lighting device at a USB contact, instead of in an E14 or E27 socket.

In the embodiment described with reference to FIG. 1, the metal strip 120 does not extend all the way around the light guide 110. The metal strip 120 has a gap 121 at the base of the lighting device 100, such that two ends 122 and 123 of the metal band 120 fits in the cap 170 (or is sandwiched) such that the metal strip 120 is held in place by the cap 170.

When the lighting device 100 has been assembled, the LEDs 130 are arranged between the metal strip 120 and the light guide 110 and may for example be held in place by the metal band 120.

Some heat generated by the LEDs 130 is dissipated to the environment (or ambient) of the lighting device 100 by the metal strip 120. The metal strip 120 also transfers heat generated by the LEDs 130 to the light guide 110 which dissipates heat to the environment (or ambient) of the lighting device 100. Both the metal strip 120 and the light guide 110 may serve as heat sinks.

Light emitted by the LEDs 130 propagates within the light guide 110 (e.g. including one or more total internal reflections within the light guide 110) before being emitted by one or more of the main surfaces 112 and 113 of the light guide 110. The light guide 110 provides a larger light emitting surface than the light emitting surface of a LED.

Figure 2:
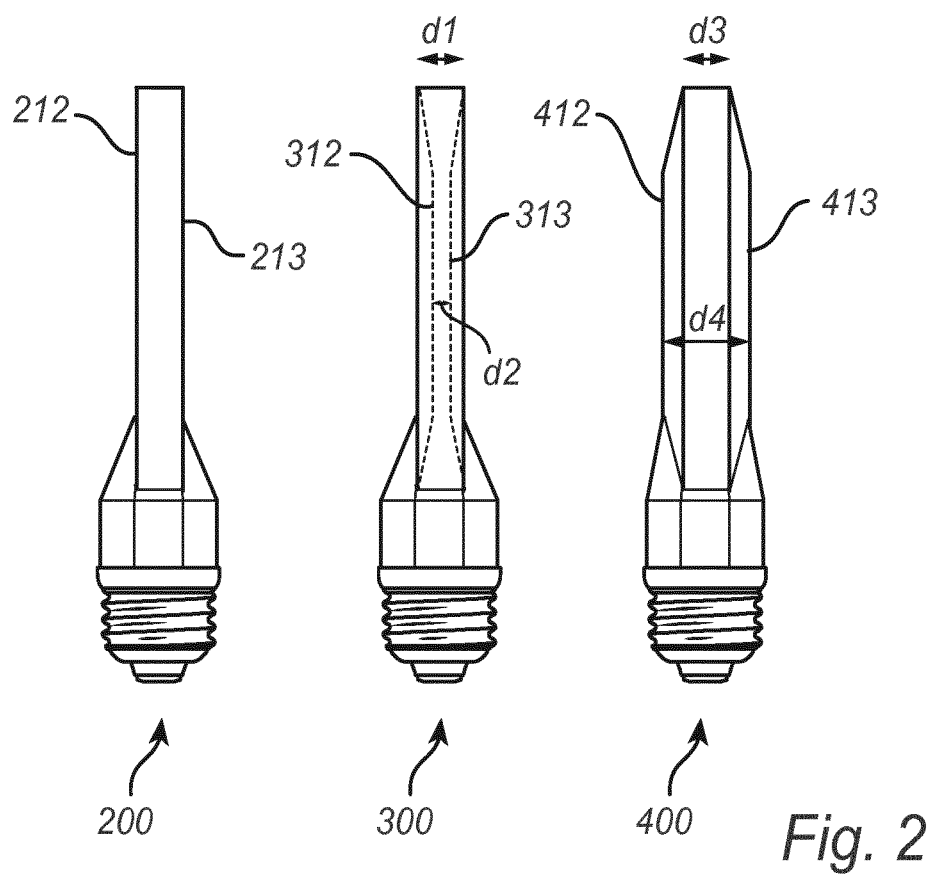
FIG. 2 shows side views of lighting devices according to some embodiments.

FIG. 2 shows side views of lighting devices according to some embodiments.

A first lighting device 200 has a light guide with flat main surfaces 212 and 213. The light guide of the first lighting device 200 has constant thickness.

A second lighting device 300 has a light guide with main surfaces 312 and 313 which extend inwards (or which are inward curved) such that the light guide has one thickness d1 at the edge of the light guide and a smaller thickness d2 at the center of the light guide.

A third lighting device 400 has a light guide with main surfaces 412 and 413 which extend outwards (or which are outward curved) such that the light guide has one thickness d3 at the edge of the light guide and a larger thickness d4 at the center of the light guide.

The differently shaped light guides described with reference to FIG. 2 may be employed for providing differently shaped light outputs and/or different light intensity distributions. The shape of the light guide may also affect thermal properties of the lighting device.

Any of the shapes described with reference to FIG. 2 may be employed for the main surfaces 112 and 113 of the light guide 110 described with reference to FIG. 1.

An example simulation of the lighting device 100, described with reference to FIG. 1, will now be described.

In the simulation, the main surfaces 112 and 113 of the light guide 110 are flat, as described for the first lighting device 200, with reference to FIG. 2. The operating position of the lighting device 100 during the simulation is vertical in free air of 25° C. A distributed heat load (a line) corresponding to the LEDs 130 distributed around the light guide 110, is employed. The driver electronics 160 are not included in the simulation. The light guide 110 is made of glass with thermal conductivity of k=0.8 W/mK. The light guide 110 has a thickness of 12 mm. The metal strip 120 is a 1 mm thick aluminum strip. The simulation is performed both for a metal strip 120 having a surface finish of bare metal (reflectivity $\varepsilon$=0.1), and for a metal strip 120 having a reflective coating (reflectivity c=0.9). A gap of 50 mu air between the metal strip 120 and the light guide 110 is employed.

The simulation provides the following relations between maximum temperature [° C.] at the metal strip 120 and total LED heat load [W]:

$$T\_max = 31.7 + 9.877 Q\_LED \quad \text{low emission:}$$

$$T\_max = 30.8 + 8.555 Q\_LED \quad \text{high emission:}$$

The simulation also shows the following:

A breakdown of the heat flow to the ambient shows that 60-70% of the heat load on the metal strip 120 is transferred by the glass light guide 110.

The glass light guide 110 is acting as a heat sink.

If a PMMA light guide 110 is employed instead of a glass light guide 110, the contribution to the Rth (thermal resistance) is 50% by the light guide 110 and 50% by the metal strip 120.

The thermal resistance of the system strip-to-ambient for a high surface emission strip 120 is 8.55 K/W.

The low thermal resistance means that the concept is suitable for providing a lumen output up to 1000 lumen. An overview of example lighting devices with 806 lumen output is given in Table 1 below. Table 1 refers to the case of high surface emission, glass light guide, and 3020 type LEDs.

TABLE 1

| Tj [° C.] | If [A] | #LED | Tstrip [° C.] | Phi LED [lm] | P LED [W] | V string [V] | Phi Lamp [lm] |
|---|---|---|---|---|---|---|---|
| 100.1 | 0.228 | 14 | 90.9 | 948.2 | 9.9 | 43.5 | 806 |
| 96.1 | 0.196 | 16 | 88.3 | 948.2 | 9.6 | 49.2 | 806 |
| 92.9 | 0.171 | 18 | 86.1 | 948.2 | 9.4 | 54.7 | 806 |
| 90.2 | 0.152 | 20 | 84.2 | 948.2 | 9.1 | 60.3 | 806 |
| 87.8 | 0.136 | 22 | 82.6 | 948.2 | 8.9 | 65.7 | 806 |

In Table 1, Tj is the junction temperature, If is the LED current, # LED is the number of LEDs, Tstrip is the temperature of the metal strip 120 at the LED source, Phi LED is the light output from the LEDs, P LED is the electrical power, V string is the voltage across the LED string, and Phi Lamp is the light output from the lighting device 100.

Figure 3:
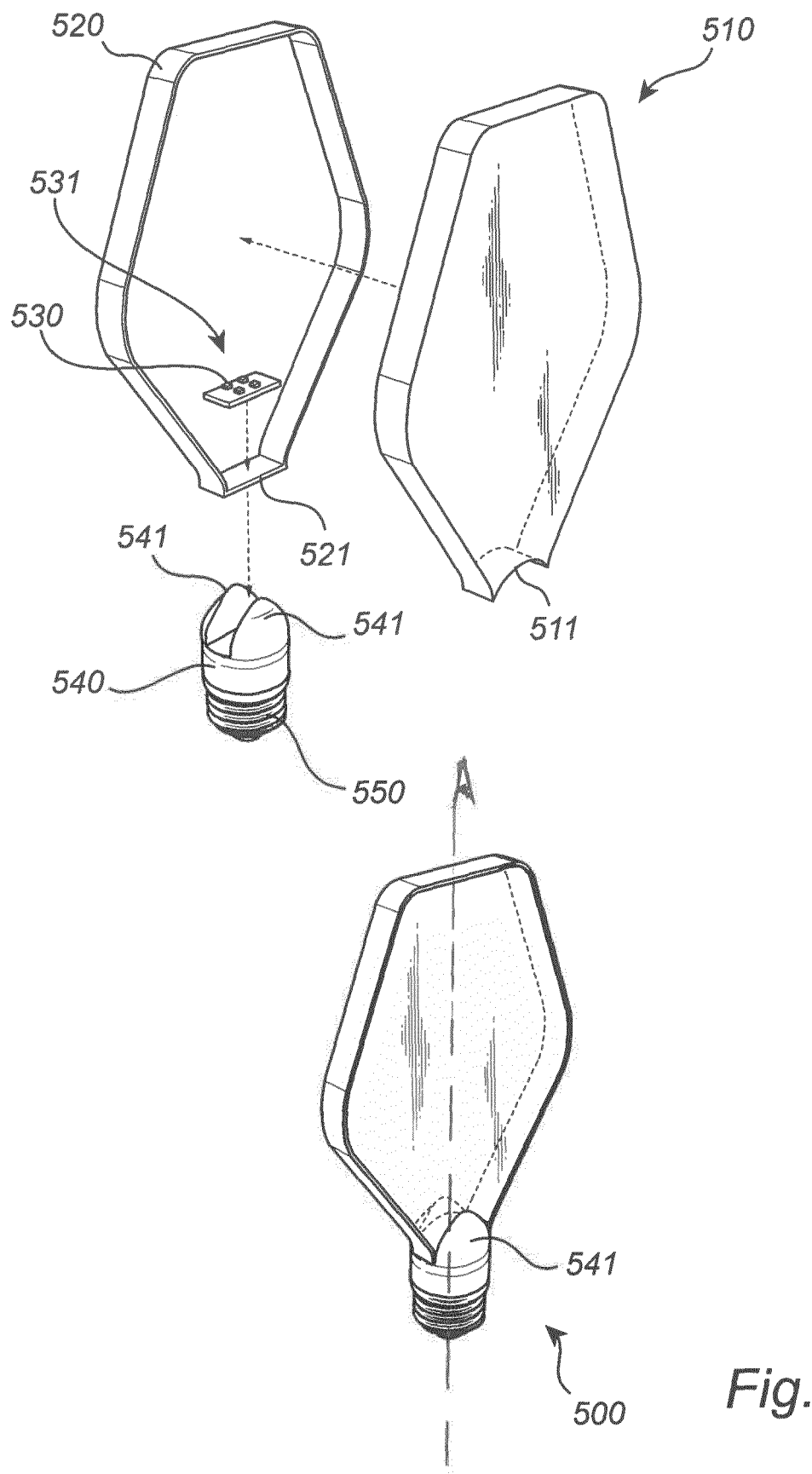
FIG. 3 shows an exploded view of a lighting device, as well as the lighting device in assembled form, according to an embodiment.

The upper part of FIG. 3 shows an exploded view of a lighting device 500 according to an embodiment, and the lower part of FIG. 3 shows the lighting device 500 in assembled form. The lighting device 500 comprises a light guide 510, a metal strip 520 and a plurality of solid state light sources 530. The lighting device 500 is similar to the lighting device 100, described with respect to FIG. 1, but there are a few differences, as outlined below.

Firstly, the solid state light sources 530 (or LEDs) are arranged at a base of the lighting device 500 instead of being distributed around the light guide 510.

Secondly, the metal band 520 extends all the way around the light guide 510, and the light sources 530 are mounted on a base portion 521 of the metal strip 520.

Thirdly, the light guide 510 has a cavity 511 in which the light sources 530 are arranged. The curved shape of the cavity 511 acts as an incoupling structure for coupling light emitted by the solid state light sources 530 into the light guide 510. Light from the light sources 530 may be mixed in the light guide 510. A plurality of LEDs 530 may for example emit light of different colors, which may be mixed in the light guide 510 for providing a light mix (e.g., a white light mix).

The lighting device 500 further comprises a base/support (or housing) 540 in which driver electronics (not shown in FIG. 3) for controlling the light sources 530 are arranged. The base 540 may for example comprise polymer material for providing electrical insulation or of metal (e.g. aluminum) for transferring heat away from the driver electronics.

In the present embodiment, the base 540 comprises protruding side walls 541 which, when the lighting device 500 is assembled, prevent light from the solid state light sources 530 from escaping at the sides of the cavity 511 before reaching the light guide 510. The protruding portions 541 may for example be reflective.

As the light sources 530 are concentrated at the base of the lighting device 500, the metal strip 520 may be thicker than the metal strip 120 of the lighting device 100, described with reference to FIG. 1, so as to efficiently transfer heat away from the base of the lighting device 500.

Arrangement of the light sources 530 at the base of the lighting device 530 (instead of distributing the light sources 530 around the light guide 510) allows for reducing the number of light sources 530. The lighting device 500 further comprises a cap 550 for mounting the lighting device 500 in a socket. As described above in relation to the lighting device 100, described with reference to FIG. 1, the lighting device 500 may for example comprise other types of electrical interfaces than a cap. The lighting device 500 may for example comprise a USB interface.

It will be appreciated that the light sources 530 may be mounted at the base of the lighting device 500 also in the absence of a base portion 521 of the metal strip 520. Embodiments may for example be envisaged in which the metal strip 520 does not extend all the way around the light guide 510, and wherein a circuit board 531, on which the light sources 530 are mounted, may be held in place between (and may be in thermal contact with) end portions of the metal strip 520 similar to the end portions 122 and 123 described with reference to FIG. 1. Embodiments may also be envisaged in which the light sources 530 are mounted on the base/housing 540, between the protruding portions 541. In embodiments wherein the light sources 530 are mounted on the base/housing 540, the lighting device may be manufactured in an initial step without the light guide 510 and the metal strip 520. The light guide 510 and the metal strip 520 may be connected to the lighting device 500 in a subsequent step, providing a modular system with interchangeable optical elements, e.g. in the form of differently shaped light guides and/or light guides with different outcoupling structures.

The thermal resistance (from the light sources 530 to ambient) of the lighting device 500, described with reference to FIG. 3, may for example be Rth=10 K/W. This is higher than the thermal resistance for the lighting device 100, described with reference to FIG. 1. The configuration of the lighting device 500 may be suitable up to at least 806 lumen.

Figure 4:
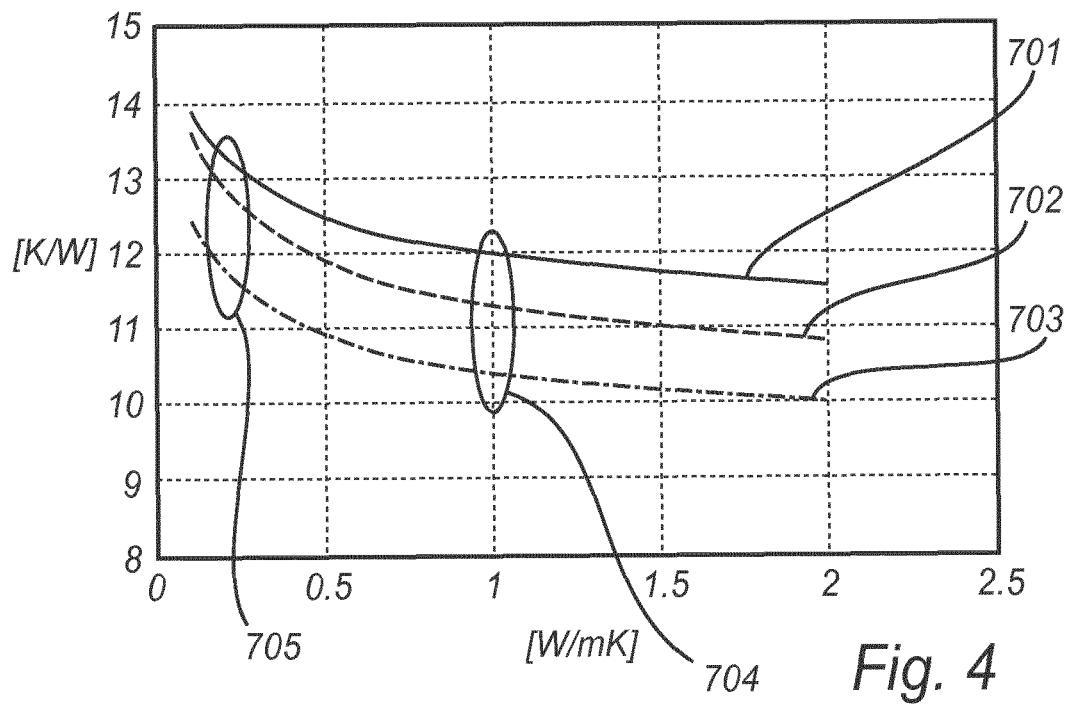
FIG. 4 shows a graph illustrating thermal behaviors for lighting devices according to some embodiments.

FIG. 4 shows a graph illustrating thermal performance of the lighting device 500, for different choices of material for the light guide 510 and different thicknesses of the metal strip 520.

Thermal conductivity of the light guide 510 in W/mK is shown along the horizontal axis, and thermal resistance of the lighting device 500 (from the light sources 530 to ambient) in K/W is shown along the vertical axis. In the present example, the light guide 510 is 10 mm thick, and both the metal strip 520 and the base of the lighting device 500 have a surface finish with relatively high emissivity of thermal radiation.

The uppermost curve 701 in the graph is for a 2 mm thick metal strip 520. The middle curve 702 is for a 3 mm thick metal strip 520. The lowermost curve 703 is for a 4 mm thick metal strip 520.

Note that for a thicker metal strip 520, the base diameter of the lighting device 500 may be increased. In particular, the lowermost curve 703 corresponds to using a 4 mm thick metal strip 520, but also a larger base diameter of the lighting device 500 than for the other curves 701 and 702.

A thermal conductivity of 1 W/mK, which corresponds to a glass light guide 510, is indicated by the rightmost oval 704. In the present example, the obtained thermal resistance (Rth) using a glass light guide 510 and a 3 mm thick metal strip is 11.4 K/W.

A thermal conductivity of 0.2 W/mK, which corresponds to a PMMA light guide 510, is indicated by the leftmost oval 705. In the present example, the obtained thermal resistance (Rth) using a PMMA light guide 510 and a 3 mm thick metal strip is 12.9 K/W.

The thermal conductivity is higher for glass than for PMMA, and as shown in FIG. 4, a lower thermal resistance of the lighting device 500 may be obtained with a glass light guide 510. However, PMMA has optical properties which may be better for use in a light guide 510, and surfaces of a PMMA light guide 510 may be protected against fingerprints and scratches. An optimal choice of material for the light guide 510 may therefore depend on the intended application of the lighting device 510.

Figure 5:
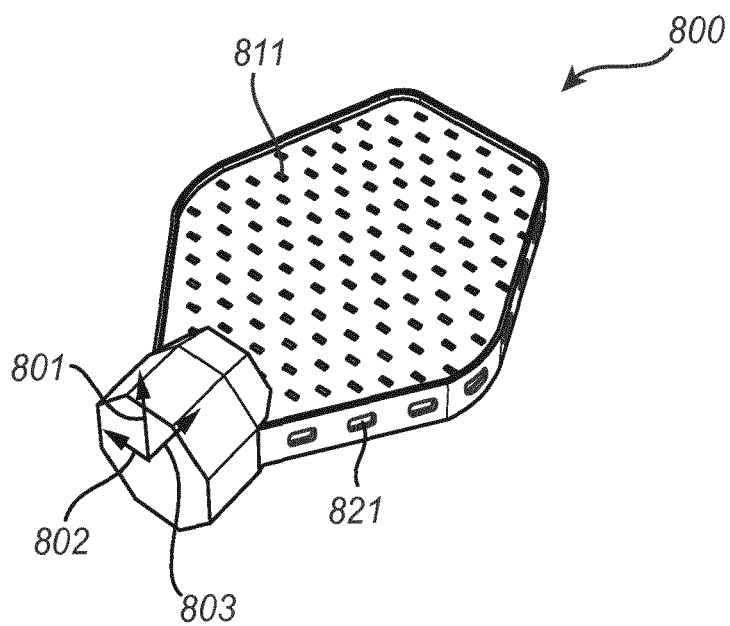
FIG. 5 shows a perspective view of a lighting device according to an embodiment.

FIG. 5 shows a perspective view of a lighting device 800 according to an embodiment. The lighting device 800 is similar to the lighting device 500, described with reference to FIG. 3, except that the light guide has outcoupling structures 811 on its main surfaces, and that the metal strip is perforated.

The outcoupling structures 811 may be provided for coupling light propagating within the light guide out of the light guide. The outcoupling structures 811 may for example be provided in the form of a certain surface structure, irregularities or perforations in the light guide.

The outcoupling structures 811 may for example be provided for scattering light emitted by the light guide, so at to provide a more omnidirectional light output of the lighting device 800.

The perforations 821 of the metal strip may be provided as openings or holes through the metal strip. The perforations 821 allow light to be emitted through the edge of the light guide, which provides a more omnidirectional light output. As the light guide contributes to the dissipation of heat to the environment (or ambient) of the lighting device 800, perforations 821 may be provided in the metal strip without a significant impact on the thermal performance of the lighting device 800.

In the present embodiment, the perforations/openings 821 constitute 50 percent of the length of the metal strip, i.e. distances covered by the perforations/openings 821 along the metal strip together amount to 50 percent of the length of the metal strip. In other words, the aggregated distance covered by the perforations 821 along the metal strip is 50 percent of the length of the metal strip.

Figure 6:
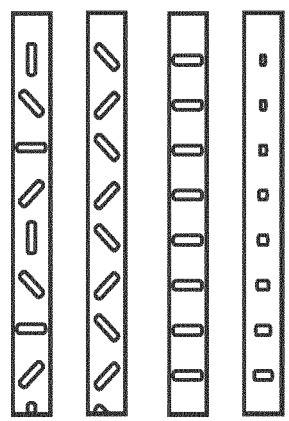
FIG. 6 shows example perforation patterns for a metal strip according to some embodiments.

FIG. 6 shows examples of perforation patterns for a metal strip, according to some embodiments. Many other perforation patterns may also be envisaged.

The perforation patterns shown in FIG. 6 may for example be employed in any of the lighting devices described with reference to FIGS. 1-5. Similarly, the outcoupling structures 811, described with reference to FIG. 5, may for example be employed in any of the lighting devices described with reference to FIGS. 1-5.

In addition to the perforations 821, or as an alternative to perforations, the metal strip may for example be narrower than the edge (of the light guide) along which it is arranged.

In for example the lighting device 100, described with reference to FIG. 1, the edge 111 of the light guide 110 could for example have a width d, and the metal strip 120 could for example have a width smaller than d so that part of the edge 111 is not covered by the metal band 120. Use of such a narrow metal band allows for light to be emitted from the edge 111 of the light guide 110.

The lighting devices described with reference to FIG. 1-6 may also comprise incoupling structures for coupling light from the light sources into the light guide. For example, the cavity 511 of the lighting device 500, described with reference to FIG. 3, is curved so as to act as an incoupling structure for coupling light from the light sources 530 into the light guide 510. Incoupling structures may for example include a shape or structure of a surface of the light guide 510 facing the light sources 530.

Figure 7:
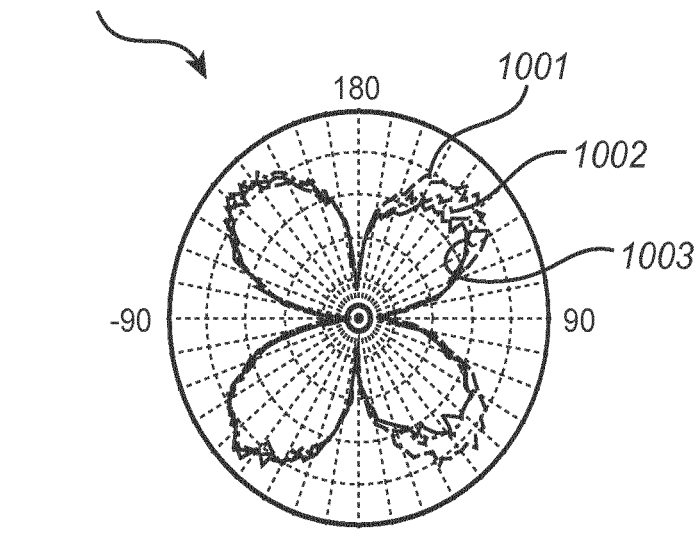
FIGS. 7 and 8 show light intensity distributions for lighting devices according to some embodiments.

FIG. 7 shows a light intensity distribution 1000 for a lighting device similar to the lighting device 800, described with reference to FIG. 5, except that there is no perforation in the metal band and no light scattering outcoupling structure. In the present example, the metal strip is provided with a highly reflective layer so that the reflectivity of the metal strip is 95%. The optical efficiency obtained in the present example is 75%.

The light intensity distribution 1000 includes three curves. A first curve 1001 represents the intensity distribution along a first plane parallel to the light guide of the lighting device (i.e. corresponding to the plane 140 described with reference to FIG. 1, and the plane formed by the axes/arrows 802 and 803 in FIG. 5). A second curve 1002 represents the light intensity distribution along a second plane which is 45 degrees rotated relative to the first plane. A third curve 1003 represents the light intensity distribution along a third plane which is perpendicular to the first plane and to the light guide of the lighting device (i.e. corresponds to a plane formed by the axes/arrows 803 and 801 in FIG. 5). In the intensity distribution 1000, "90" corresponds the top of the lighting device (i.e. corresponds to the direction of the arrow 803 in FIG. 5) and "−90" corresponds to the base of the lighting device (i.e. corresponds to the opposite direction of the arrow 803 in FIG. 5).

Figure 8:
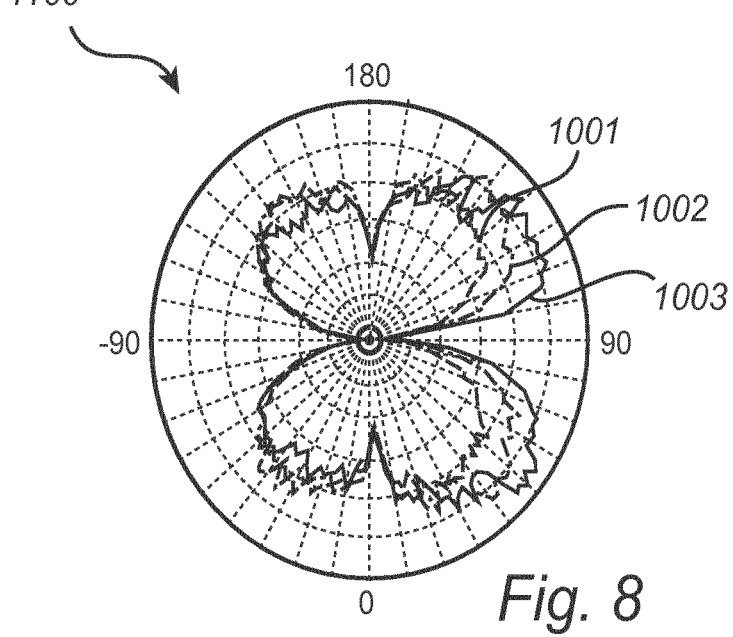

FIG. 8 shows a light intensity distribution 1100 for a lighting device similar to the lighting device 800, described with reference to FIG. 5, except that there is no perforation in the metal band (but there are outcoupling structures of the same type as in the lighting device 800). In the present example, the metal strip is provided with a highly reflective layer so that the reflectivity of the metal strip is 95%. The optical efficiency obtained in the present example is 84%.

The light intensity distribution 1100 includes three curves. A first curve 1101 represents the intensity distribution along a first plane parallel to the light guide of the lighting device. A second curve 1102 represents the light intensity distribution along a second plane which is 45 degrees rotated relative to the first plane. A third curve 1103 represents the light intensity distribution along a third plane which is perpendicular to the first plane and to the light guide of the lighting device. In the intensity distribution 1100, "90" corresponds the top of the lighting device (i.e. corresponds to the direction of the arrow 803 in FIG. 5) and "−90" corresponds to the base of the lighting device (i.e. corresponds to the opposite direction of the arrow 803 in FIG. 5). A comparison of the two intensity distributions 1000 and 1100 (in particular the respective third curves 1003, 1103) shows that outcoupling structures in the light guide lead to a more omnidirectional light output of the lighting device. If perforations are provided in the metal strip (as exemplified by the perforations 821 described with reference to FIG. 5), light may be emitted also along the edge of the light guide, and a more omnidirectional light output may be provided.

Although the metal strips described with reference to FIGS. 1-6 are flat, other shapes of the metal strips may be envisaged. For example, a metal strip may be envisaged which has a U-shaped cross-section, and which covers parts of both the edge 111 and the main surfaces 112 and 113 of the light guide 110 of the lighting device 100, described with reference to FIG. 1.

The person skilled in the art realizes that the present invention by no means is limited to the preferred embodiments described above. On the contrary, many modifications and variations are possible within the scope of the appended claims. For example, it will be appreciated that the metal strip need not necessarily extend all the way around the light guide. The metal strip may for example extend halfway around the light guide, or a third of a full revolution around the light guide.

It will also be appreciated that the solid state light sources need not necessarily be arranged between the light guide and the metal strip. Embodiments may be envisaged in which one or more solid state light sources are arranged along a main surface of the light guide. For example, one or more solid state light sources may be arranged along a main surface of the light guide (e.g. along the main surface 112 in FIG. 1) and may be in thermal contact with a metal strip surrounding the light guide (e.g. the metal strip 120 in FIG. 1) via a metal substrate (e.g. via an additional metal strip). The solid state light sources may emit light into the light guide and heat may be dissipated to the surrounding via the metal substrate, the metal strip and the light guide.

Embodiments may also be envisaged in which a lighting device comprises only a single solid state light source (or LED), instead of a plurality of light sources.

Further, although the light guides described with reference to FIGS. 1-6 all have similar shapes, other shapes may also be envisaged for these light guides. For example, the light guide 110, described with reference to FIG. 1, may in general have more or less any shape along the plane 140, but may have a limited thickness (e.g., measured along a normal to the plane 140). However, a particular desired optical light output may impose restrictions of the shape of the light guide 140, such as having a convex (or semi-convex) cross-section along the plane 140. The light guide 140 may for example have a circular or elliptic cross-section along the plane 140.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising: a longitudinal axis; a light guide extending along a plane positioned parallel to said longitudinal axis; said light guide having at least two main surfaces and an edge joining said main surfaces; said main surfaces being arranged for emitting light from said lighting device; a metal strip extending at least partly around the light guide along the edge of the light guide, the metal strip being arranged in thermal contact with the edge, wherein the width of the metal strip exceeds the thickness of the metal strip, wherein the width of the metal strip is measured in a direction from a first main surface of said at least two main surfaces to a second main surface of said at least two main surfaces and wherein the thickness of the metal strip is measured from said light-guide to an outermost portion of said metal strip away from said light guide, wherein the metal strip comprises at least one perforation such that a portion of said light emitted into the light guide is transmitted out of the lighting device through said at least one perforation; a solid state light source arranged in thermal contact with the metal strip and arranged to emit light into a portion of the edge of the light guide; said solid state light source being configured to transfer heat to the metal strip and the light guide, the light guide being arranged for dissipating heat to the ambient, both the metal strip and the light guide serving as heat sink; and a base for mounting the lighting device, the base including an electrical interface for connecting the sold state light source to an electrical power supply.

2. The lighting device of claim 1, wherein the solid state light source is arranged between the light guide and the metal strip.

3. The lighting device of claim 2, comprising a plurality of solid state light sources distributed around the light guide between the light guide and the metal strip, the plurality of solid state light sources being arranged to emit light into the center of the light guide.

4. The lighting device of claim 1, wherein the thickness of the metal strip is between 2 to 5 millimeters.

5. A lighting device comprising: a longitudinal axis; a light guide extending along a plane positioned parallel to said longitudinal axis; said light guide having at least two main surfaces and an edge joining said main surfaces; said main surfaces being arranged for emitting light from said lighting device; a metal strip extending at least partly around the light guide along the edge of the light guide, the metal strip being arranged in thermal contact with the edge; a solid state light source arranged in thermal contact with the metal strip and arranged to emit light into a portion of the edge of the light guide; said solid state light source being configured to transfer heat to the metal strip and the light guide, the light guide being arranged for dissipating heat to the ambient, both the metal strip and the light guide serving as heat sink, wherein the metal strip comprises at least one perforation such that a portion of said light emitted into the light guide is transmitted out of the lighting device through said at least one perforation; and a base for mounting the lighting device, the base including an electrical interface for connecting the sold state light source to an electrical power supply.

6. The lighting device of claim 5, wherein the base includes a cap for mounting the lighting device in a socket.

7. The lighting device of claim 5, wherein the light guide comprises glass or polymer material.

8. The lighting device of claim 5, wherein the light guide extends at least four times more in a direction along said plane than along a normal to said plane.

9. The lighting device of claim 5, wherein the metal strip extends at least a third of a full revolution around the light guide, or wherein the lighting device comprises at least two metal strips together extending at least a third of a full revolution around the light guide.

10. The lighting device of claim 5, wherein the metal strip is arranged in direct physical contact with said surface of the light guide or wherein a distance between the metal strip and said surface of the light guide is less than 200 micrometer.

11. The lighting device of claim 5, wherein the solid state light source is arranged between the light guide and the metal strip.

12. The lighting device of claim 5, comprising a plurality of solid state light sources distributed around the light guide between the light guide and the metal strip, the plurality of solid state light sources being arranged to emit light into the light guide.

13. The lighting device of claim 5, wherein the light guide has a cavity in which the solid state light source is arranged.

14. The lighting device of claim 5, wherein at least a side of the metal strip facing the light guide has at least 80 percent reflectivity.

15. The lighting device of claim 5, wherein the metal strip has a width which is smaller than a width of said edge, wherein said width of the metal strip and said width of the edge are measured in a direction from a first main surface of said at least two main surfaces to a second main surface of said at least two main surfaces.

16. The lighting device of claim 5, further comprising an incoupling structure for coupling light from the solid state light source into the light guide.

17. The lighting device of claim 5, further comprising an outcoupling structure for coupling light propagating within the light guide out of the light guide.

18. The lighting device of claim 5, further comprising driver electronics for controlling the solid state light source, wherein:
  the light guide has a cavity in which the driver electronics are arranged; or
  the lighting device further comprises a housing in which the driver electronics are arranged.

19. The lighting device of claim 5, wherein the metal strip comprises a flat metal band configured to be folded around the edge of the light guide.

* * * * *